United States Patent [19]

Smith

[11] 3,932,847
[45] Jan. 13, 1976

[54] TIME-OF-DAY CLOCK SYNCHRONIZATION AMONG MULTIPLE PROCESSING UNITS

[75] Inventor: Ronald Morton Smith, Wappingers Falls, N.Y.

[73] Assignee: International Business Machines Corporation, Armonk, N.Y.

[22] Filed: Nov. 6, 1973

[21] Appl. No.: 413,296

[52] U.S. Cl. ............................................. 340/172.5
[51] Int. Cl.² .......................................... G06F 1/04
[58] Field of Search .................. 340/172.5, 146.1 D

[56] References Cited
UNITED STATES PATENTS 3,715,729   2/1973   Mercy ............................ 340/172.5
3,761,884   9/1973   Ausan et al. ..................... 340/172.5

Primary Examiner—Gareth D. Shaw
Assistant Examiner—Michael C. Sachs
Attorney, Agent, or Firm—Bernard M. Goldman

[57] ABSTRACT

Circuits and method for synchronizing and checking a plurality of time-of-day (TOD) clocks in a multiprocessing system. Unique hardware synchronizes the low order part of the TOD clocks and a unique method synchronizes the high order part in the same clocks by using carry pulses derived from an intermediate bit position in each TOD clock. The carry pulses from all TOD clocks are combined in an OR circuit with each clock to provide common carry pulses for synchronizing each TOD clock in the system.

5 Claims, 5 Drawing Figures

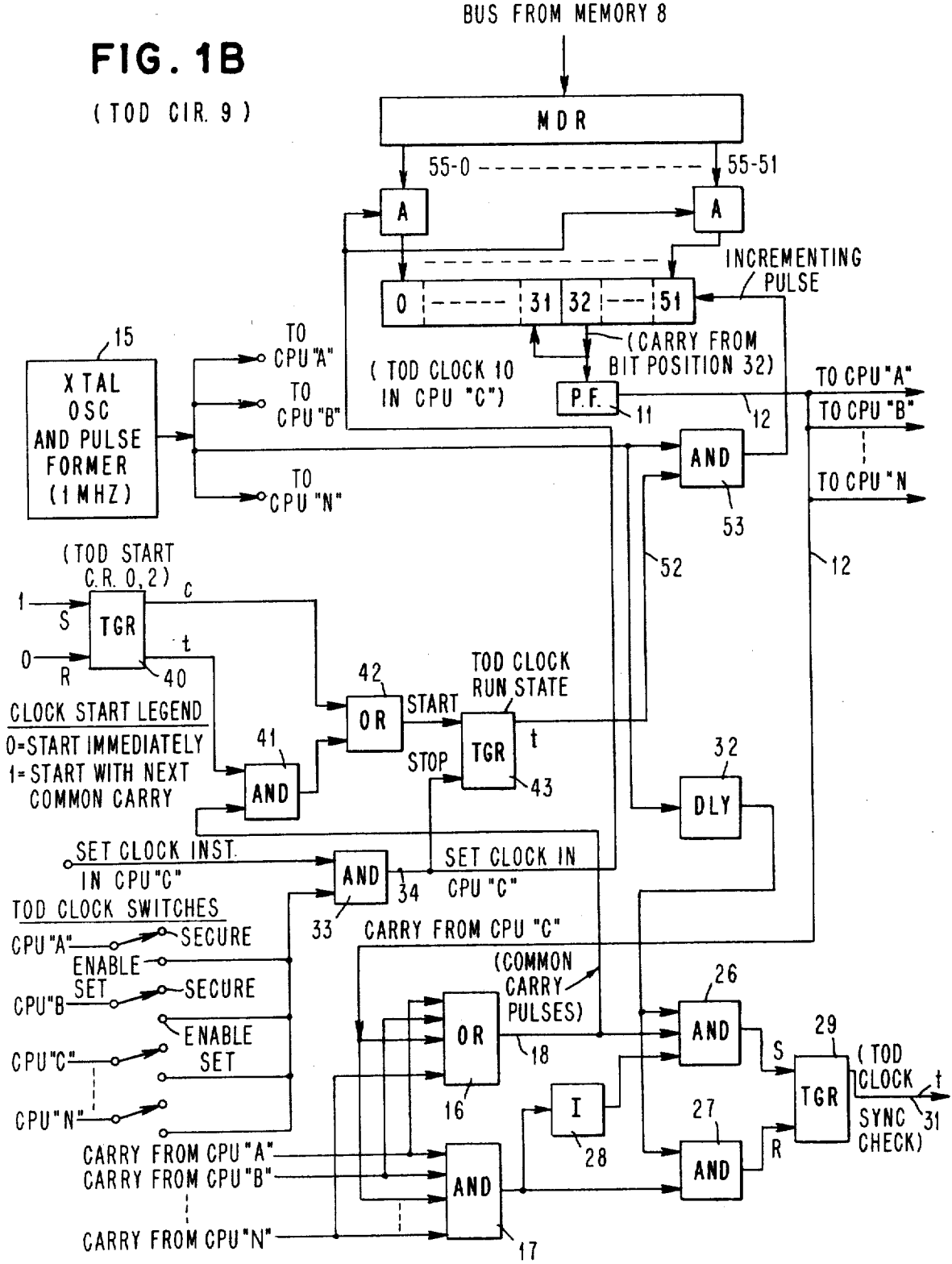

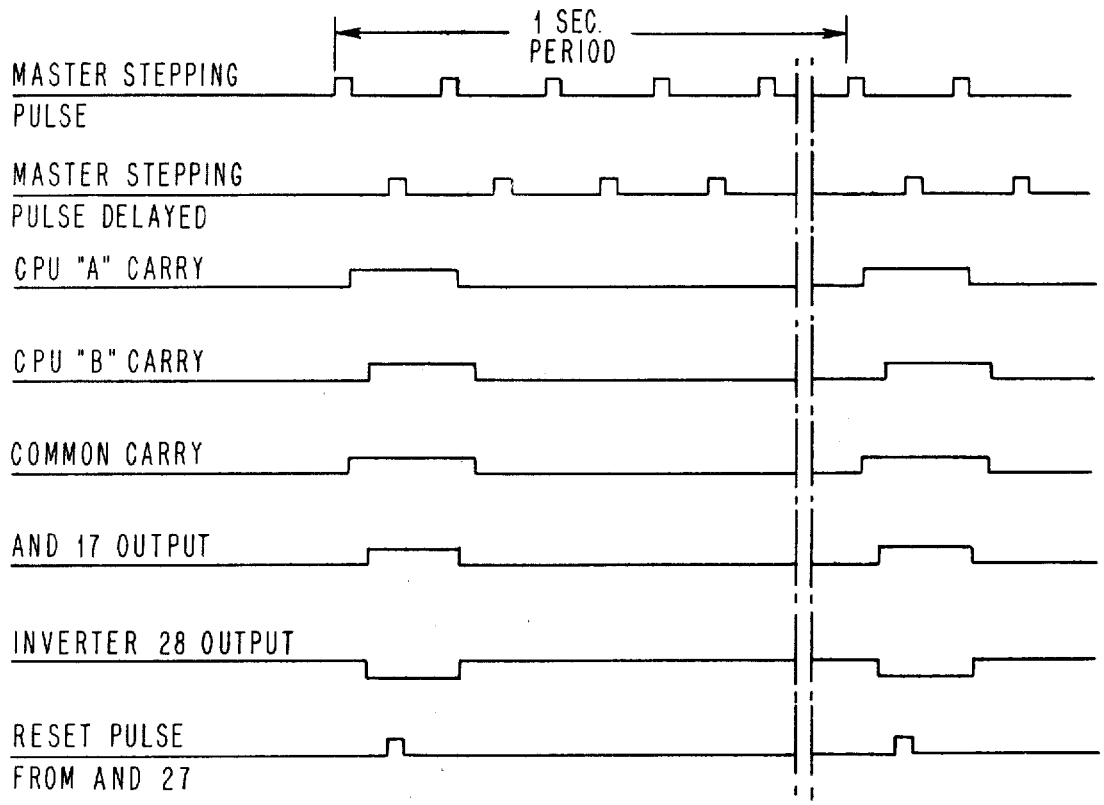
FIG. 3A (IN-SYNC)
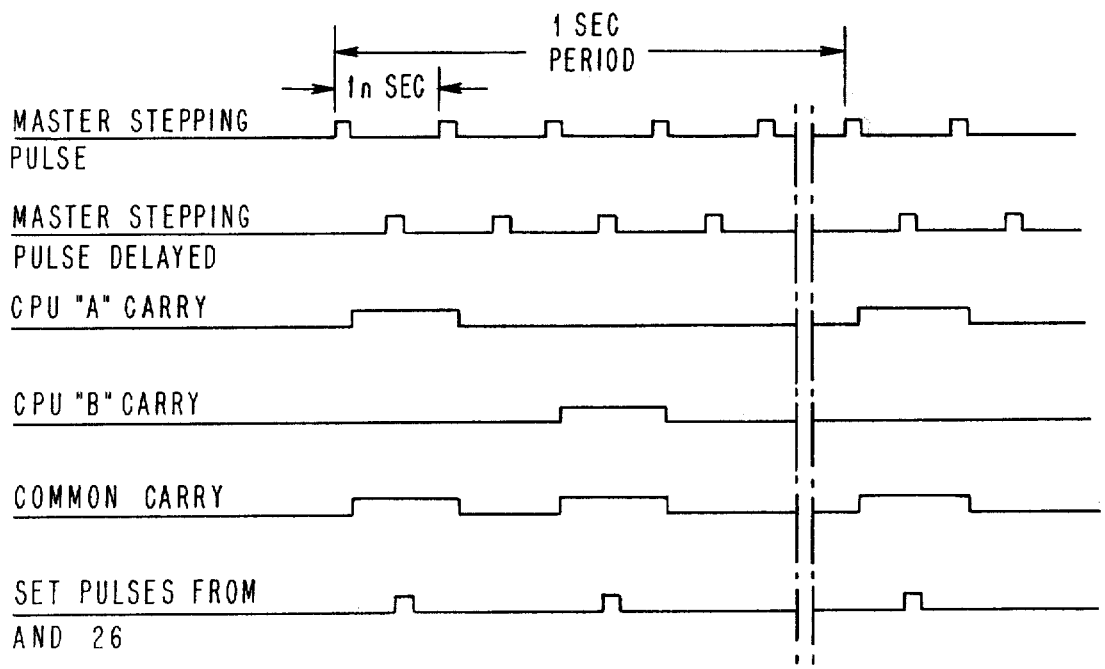
FIG. 3B (OUT-OF-SYNC)

3,932,847

TIME-OF-DAY CLOCK SYNCHRONIZATION AMONG MULTIPLE PROCESSING UNITS

BACKGROUND OF THE INVENTION

This invention relates generally to obtaining synchronization among the time-of-day (TOD) clocks in a plurality of processing units, commonly called CPUs, which may be interconnected at a single installation, such as in a multiprocessing system.

For example, the TOD clock in an IBM S/370 CPU operates on a calendar basis, e.g. 143 years without recycling, and it is generally set to provide the calendar date and time with an accuracy of about a second from a standard time origin, which usually is Jan. 1, 1900, 0 AM Greenwich Mean Time (GMT). In using the standard epoch, the highest-order bit of the TOD clock is flipped to its set state on May 11, 1971 at 11:56:53.685248 A.M. GMT. A program can test the highest-order bit to determine if the TOD clock is using the standard epoch.

The operation of any TOD clock must not be affected or inhibited by any normal activity or event in the system. The clock continues to run whether its CPU is in wait to stop state or in the instruction-step, single cycle, or test mode; and the clock operation is not affected by system clear resets, initial program load procedure, or any programmed operation except the protected set clock operation. In some implementations the clock can even run with CPU power off.

A synchronization problem occurs when plural TOD clocks exist in a multiprocessing system; this usually occurs because CPUs are manufactured to operate in a uniprocessing system as well as in a multiprocessing system and hence each CPU may contain a TOD clock. It is not considered a satisfactory solution to have the clocks operate independently in separate CPU's in a multiprocessing system, because their different time values would be a source of error in CPU intermixed time computation. Nor is it satisfactory to have one clock for all CPUs, because the system time must be totally reliable at all times, and if one clock fails at least one other must be available.

Thus in a multiprocessing system, such as an IBM S/370 MP system, it is desirable that all of its TOD clocks provide the identical time-of-day. Each CPU's separate TOD clock must be integrated into the multiprocessing system in such a manner that all TOD clocks provide the same time. Thus the crystal oscillator of one of the TOD clocks is converted as a single source of oscillator pulses provided to all TOD clocks, so that they will stay in synchronism, once gotten into synchronism by operation of this invention.

It is essential in a multiprocessing system to have precisely the same time available to any CPU from the TOD clock in the same or any other CPU in the system.

It is well known in the art that a TOD clock in a uniprocessing system may be set within a one second accuracy by manually starting the clock at a predetermined time set into it. In an IBM S/370 system, this is done by a computer operator initiating a program to continuously attempt to set a TOD clock to an operator requested time. The operator then manually depresses the handle of a TOD clock switch on the system console to its "enable-set" position at the predetermined time. When the switch is depressed it enables the program to set the time into the TOD clock and starts it running. The switch is then put in its "secure" position so that the state of the TOD clock cannot thereafter be changed by any program operation.

This manual time setting method cannot be used to synchronize the TOD clocks in a multiprocessing system, because the manual operation only has an accuracy of about one second, and synchronization requires the TOD clocks to have the same time within one millionth of a second, which is well beyond the time in which a human can react. Thus the manual method can be used to set one of the TOD clocks in the system to an external standard, e.g. radio station WWV; but then the other clocks must be synchronized with the set clock by another method, such as by this invention.

If the above procedure were modified such that the TOD clocks in the system can be set when the switch is depressed, but do not start until the switch is released, then it would be possible to set all clocks to the same value and then let them start simultaneously. However, such a procedure requires that all clocks be set in order to get them in synchronism. If a CPU with an unsynchronized clock is configured into the system, the real time continuity of the clocks already in the configuration is severly affected if the operator must be depended upon to reset all the clocks.

Some of the situations which can be solved by this invention are the following:

1. When a multiprocessing system is initially installed, or when power has been off on all clocks, all clocks in the system are synchronized to the identical date and time value.

2. When an additional CPU is configured into the system, or when circuit failure, maintenance, or redesign requires any TOD clock to be temporarily removed from system operation, the TOD clock is synchronized to the operational TOD clock(s) in the system without affecting their current settings.

While the multiprocessing system is normally operating, it does not make much difference which operational clock is selected for use by any program, since the operational clocks are synchronized together.

SUMMARY OF THE INVENTION

The embodiment described herein synchronizes a plurality of TOD clocks in a multiprocessing system. Each TOD clock includes sequentially connected bistable circuits and provides a time output in the form of a fixed point binary number; the clock circuit per se is not unique in this invention. A common crystal oscillator is connected to the lowest order bistable circuit in every clock to maintain them in synchronism, after this invention has put them in synchronism with each other.

This invention provides unique hardware and software that enables any TOD clock in the system to be set to the identical state of every other TOD clock in the system. The unique hardware synchronizes the low order digits of any TOD clock, and the unique program synchronizes the high order digits in the same clock.

The invention synchronizes the TOD clocks by using carry pulses derived from an intermediate bit position in each TOD clock, called the break point position because it divides the clock into two parts which are simultaneously synchronized by the hardware and software mechanisms. The break point pulses from all TOD clocks are combined in an OR circuit which provides common carry pulses for synchronizing all TOD clocks.

The invention selects as a break point position the intermediate bit position in each TOD clock having a carry pulse rate of about a one pulse per second rate. This break point rate is chosen because it is low enough to give the program ample time in the setting and checking of the high order positions of the clock. However the rate is high enough to avoid significant delay in establishing and checking synchronization when the operator requests that the clocks be set or requests configuration changes. The periodicity of the break point carry pulses has a stability of better than one-millionth of a second, which determines the degree of synchronization for the part of the TOD clock having a lower order than the break point position. Also, the invention provides the break point carry pulses to continuously check the synchronism among TOD clocks in the system. The carry pulse from the break point position is an inherently simple criteria to use because its timing indicates the instant when all of the low order positions are zero in all TOD clocks in the system. Only the high order positions need to be particularly set.

The invention provides a novel method that permits synchronization of any TOD clock to other TOD clocks currently running as a system clock without affecting its accuracy. The low order part of the clocks are synchronized through a hardware connected common break point carry pulse selected by the program which is synchronizing the higher order part of the clock.

The foregoing and other objects, features and advantages of the invention will be more apparent from the following more particular description of the preferred embodiments of the invention illustrated in the accompanying drawings of which:

FIGS. 1A and 1B are drawings of hardware connections provided for an embodiment of the invention.

FIG. 3A and 3B show examples of pulses in the synchronization check circuit in the described embodiment.

Figure 1A:
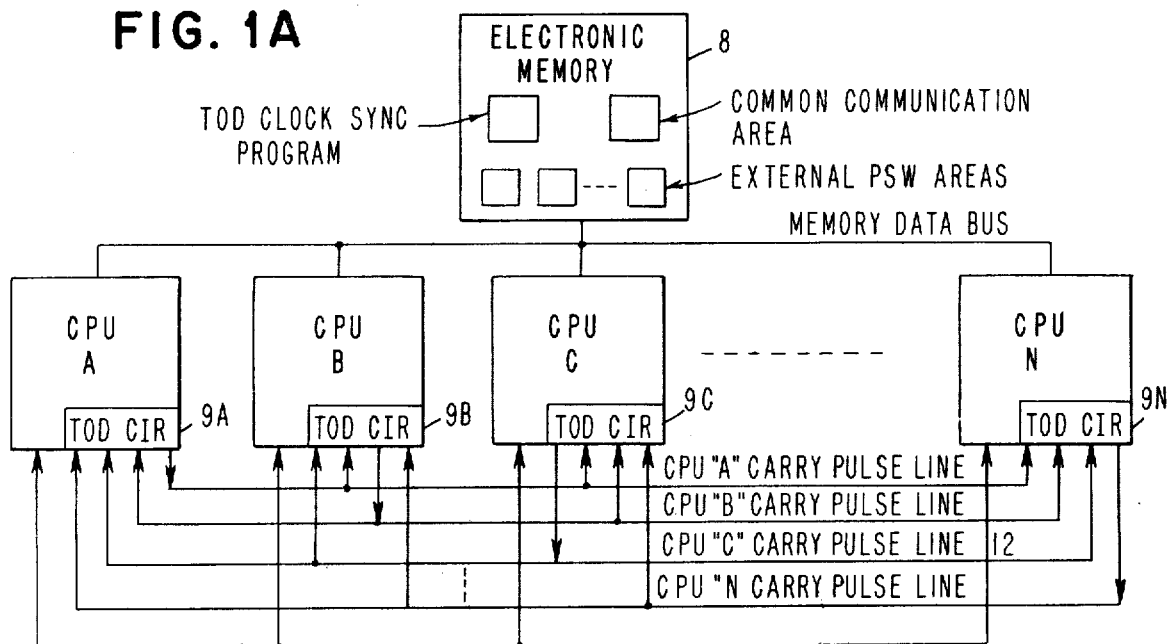

FIG. 1A illustrates a multiprocessing system containing an embodiment of the invention. It includes N number of CPUs, i.e. CPU "A", CPU "B", CPU "C" . . . CPU "N", connected through a memory data bus to an electronic memory. Each CPU has a respective time-of-day circuit 9A through 9N, of which circuit 9C is shown in detail in FIG. 1B. Each circuit of 9A through 9N is identical to that shown in FIG. 1B. Each circuit 9A – 9N has an output carry pulse line shown in FIG. 1A as having an input connection to every other CPU in the multiprocessing system.

Once one TOD clock is operating with the correct time in the multiprocessing system, the other TOD clocks can be synchronized to its time value by using the subject invention.

In circuit 9C in FIG. 1B, the TOD clock 10 comprises 52 binary connected flip-flop circuits, 0 through 51. A crystal oscillator and pulse former 15 generates a pulse having about a 100 nano-second duration once each microsecond, thus it drives the lowest order position 51 at a one megahertz rate. At this rate a carry pulse occurs out of bit position 32 into position 31 every $2^{20}$ microseconds, which is approximately once a second, i.e. it is precisely 1.048576 second. The one-second pulse rate is the reason for chosing clock position 32 as a break point position for TOD synchronization.

FIGS. 1A and 1B use the break point position's carry pulses to synchronize the part of any TOD clock having less than the one second resolution, i.e. the 20 bit positions from 32 to 51 having a lower order than position 31. A program described later herein synchronizes the high order 32 bit positions in any TOD clock.

The break point carry pulses from position 32 in each TOD clock 10 in each CPU is connected through a pulse former 11 to a line 12. Pulse former 11 generates a pulse having about a one microsecond duration upon the rise of the carry voltage from bit position 32. Inputs to an OR circuit 16 and an AND circuit 17 are connected to the respectively carry pulse line 12 in CPU "C" and to the carry pulse lines from all other CPUs in the multiprocessing system.

Common carry pulses are provided on output line 18 from OR circuit 16 to AND circuits 26 and 41.

The common carry pulses are used for two purposes: (1) to put any stopped clock into synchronism with any other operational clock being used as a standard and (2) to continuously check to determine if the TOD clocks are in synchronization.

For checking, the common carry pulses are time compared in a synchronization check circuit comprising OR circuit 16, AND circuits 17, 26 and 27, inverter 28, and trigger circuit 29. Outputs of circuits 26 and 27 respectively control the set (S) and reset (R) inputs of trigger circuit 29, which provides a TOD clock synch-check signal, indicating that the TOD clocks are not in synch, on its true ($t$) output line 31. The snychronization check circuit is, in effect, a phase detector which detects when all inputs are in-phase or out-of-phase with each other. Thus, if any input is out-of-phase, a synch-check signal is provided as an interrupt signal to its processor to signal execution of a SET CLOCK instruction.

FIGS. 3A and 3B illustrate signals relating to the synchronization check circuit. If all carry pulses to AND 17 coincide within the limits of their propagation delay and pulse width, all TOD clocks are considered to be in synchronism. FIG. 3A illustrates in-synchronism situation. Coincidence among the carry pulses in AND 17 provides an output signal which enables AND 27 to reset the TOD clock synch check trigger 29. The output of AND 17 is inverted by circuit 28 thus blocking the output of AND 26. FIG. 3B illustrates an out-of-synchronism situation. AND 26 also receives (in addition to the inverted output of AND 17) the common carry pulses from OR 18, and the sampling pulses from oscillator 15. An output is provided by inverter 28 to enable AND 26 if coincidence is lacking among the inputs to AND 17 due to lack of synchronism in one or more of the inputs provided to it from any of the TOD clocks in the system.

Thus, when any TOD clock is out of synch in any of TOD circuits 9A . . . 9N, the TOD clock sync-check trigger in all CPUs signals an interrupt condition, which alerts the program that synchronization action is required, thus initiating the clock synchronization program.

Hence the broadcasting of the carry pulses from all TOD clocks in the system to AND 17 in each TOD circuit in each CPU obtains the sync checking operation, which (via the interrupt signal from trigger 29) calls the program when needed to synchronize the out-of-sync clock. The program stops each operator-identified out-of-sync clock, sets into it the time which will occur at the next rounded second, and the circuit in FIG. 1B then synchronously starts that clock within a fraction of one-microsecond upon the occurrence of the preset time being signalled by the next common carry pulse.

The program issues a S/370 SET CLOCK instruction with the TOD clock synch control bit set to 1 to stop a TOD clock and set the high order part of the clock to the next value which will occur in the "standard" clock in which all zeros occur in its low order part. Hence the next provided carry pulse from the "standard" clock indicates that it has reached that predetermined time in its high order part and that all zeros are in its low order part; therefore that carry pulse causes the stopped clock to commence counting in synchronism with the "standard" clock.

The interrupt condition causes an interrupt code to be set in the external program status word (PSW) in a preassigned PSW area in the electronic memory for all CPU's. All PSW areas can be sensed by any CPU executing privileged instructions.

The synchronization program can be initiated by any operational CPU in the system, and therefore an arbitrary rule for selecting a CPU is used, such as by having the operator select the CPU having a clock to be used as a standard.

The following method synchronizes any out-of-sync TOD clock to a TOD clock selected by the operator, or the program, as being the standard.

Assume that the operator has just manually configured one or more CPUs, each with a TOD clock, into the system, and has typed a message requesting the control program to begin to use the added CPUs. The new clocks added will now be running at the same rate as the other clocks in the system but very likely do not have the same value.

There is a possibility, however, that all of the CPUs added have previously been in the system and have been operating on the same oscillator during the time not included in the system. In order to reduce the operator interaction, the program checks to see if the clocks are actually in synch. The program can easily detect a difference of a second or more by means of interprocessor communication. The synchronization detection part of the invention may be used to detect differences that are not an exact multiple of $2^{20}$ microseconds, and such differences are communicated to the program by means of the TOD clock synch check interruption. In the following example it is assumed that the clocks added are not in synch and therefore the operator must be requested to enable the new clocks to be set and the program uses the invention to snychronize the clocks.

In a similar situation, the operator types in the identifier of a CPU having standard TOD clock, and the identifier for each CPU having a TOD clock to be synchronized, and then requests that the clocks be synchronized.

Let us call the CPU with the clock to which others will be synchronized, the standard CPU. Let us call the CPU, or CPUs, which have clocks to be synchronized, the slave CPUs. Any CPU's in the system which are known to be in synchronism with the master do not have to take part in the following program and may continue to perform other work. Such CPUs must be disabled for TOD clock synch check interruptions until signaled to re-enable in Step 9.

Slave CPUs cannot perform useful work and must wait for instructions from the standard CPU.

(The repetition of steps 3 and 4 is required only if more than one clock requires synchronization to a group of one or more synchronized clocks. This is in order to guard against an initial false synchronization which could occur from a carry pulse from an unsynchronized TOD clock which has not yet been stopped by the set clock instruction in Step 4, due to an execution delay in its CPU. The repetition causes all clocks requiring synchronization to be stopped after it is assured that no false carries will occur. Steps 3 and 4 of the program are not required to be repeated if only two clocks are in the system configuration, but no harm is done by the repetition.) The selected operational CPU then executes the following synchronization program:

Step 1. The program in the standard CPU causes this message to be typed on the operator console: "TOD clocks added to system must be synchronized, please hold TOD clock key in ENABLE SET position." If the operator has directly requested the synchronization, only the second phrase of the message is typed. Note that in the following steps it is assumed that the operator has responded by depressing the key. If he has not, the SET CLOCK instructions will cause condition code 1 to be set indicating that the clock, is secure. The program must loop in this case, waiting for the switch to be depressed. If the switch is not depressed after a reasonable time has elasped, the program will return to this step and remind the operator.

Step 2. The program in the standard CPU executes a STORE CLOCK instruction to put the current time from its standard TOD clock into a location A1. The time in location A1 is then rounded to its next higher "seconds" value by adding one to its high order bit position 31 and setting zeros in its low order bit positions 32–63. Then the rounded value is stored in bits 0–63 at a location A2. (This rounding generates the future time which will occur upon the next carry pulse from the standard TOD clock when it provides a carry pulse from its bit position 32. This carry pulse will be provided as a common carry that is expected to synchronously start all out-of-synch clocks.)

Figure 2:
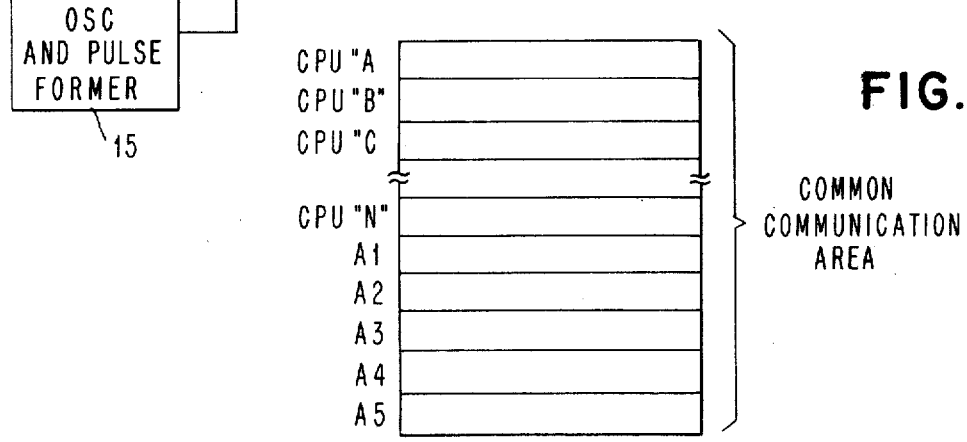
FIG. 2 shows an example of common communication areas used in the operation of an embodiment of the invention.

Step 3. The program in the standard CPU then sends a message to each slave CPU, that is, each CPU having a TOD clock to be synchronized. This is accomplished by first placing the message "REQUEST NO. 1, SYNCHRONIZE CLOCK" in a common communication area assigned to the standard CPU (See FIG. 2) in the electronic memory. Then the standard CPU executes a sequence of SIGP instructions, sending an order code signal to each such identified slave CPU. The eight bit order code sent to each slave CPU represents the order "emergency signal".

Step 4. The program in each slave CPU, on receiving the emergency signal interruption from the standard CPU, looks in the communication area assigned to the standard CPU. On seeing the message, the slave CPU sets to 1 its control register 0, bit 2, TOD clock synch control bit, which sets its trigger 40 to the 1 state. This enables later starting of the TOD clock in that CPU under the control of the next common carry pulse on line 18 via AND circuit 41. The slave CPU then executes a SET CLOCK instruction before the occurrence of the next pulse on line 18. The TOD clock switch of any CPU to be synchronized is set in the ENABLE SET position, and then AND circuit 33 provides a signal on line 34 which sets the next pulse standard time from storage location A2 into the TOD clock (AND circuits 55-0 through 55-51). Signal 34 also resets the TOD clock run state TGR 43 to stop its TOD clocks, so that the next common carry pulse can start that TOD clock. The rounded time value in location A2 was set into this stopped clock by this SET CLOCK instruction. Immediately following the execution of the SET CLOCK instruction, the slave CPU places the message: "REQUEST NO. 1 COMPLETE" in its common communication area and then enters a loop waiting for an emergency signal from the standard CPU for the next request.

Step 5. The program in the standard CPU performs a checking procedure waiting for all slave CPU communication areas to be flagged with the message "REQUEST NO. 1 COMPLETE". When all slaves have completed request No. 1, steps 3 and 4 are repeated, however this time with the message and response being "REQUEST NO. 2". Again the standard CPU performs a checking procedure waiting for all slave CPUs to be flagged with the message "REQUEST NO. 2 COMPLETE".

Since steps 3 and 4 execute asynchronously in each of the slave CPU's, it is possible that the TOD clock in one slave CPU will be stopped before the non-synched TOD clock in another slave CPU, with the possible consequence that the latter TOD clock will provide a non-synched common carry pulse that will incorrectly start the stopped clock. The repetition of steps 3 and 4 before the true carry occurs guarantees that all TOD clocks to be stopped are actually stopped even though they may have been incorrectly started by a false carry.

Step 6. The program in the standard CPU, executes a STORE CLOCK instruction which records the current time of the standard TOD clock into a common location A3.

Step 7. The program in the standard CPU executes a COMPARE followed by a CONDITIONAL BRANCH, to compare the times in A3 and A2 to test if the A3 time is less than the A2 time. If not true, the standard CPU branches to step 2 to repeat steps 2 through 7. If true, the standard CPU proceeds to step 8. (If the synchronization is being successfully done, the next carry pulse from the standard clock has not yet occurred, and the time in location A3 should therefore be less than the time in location A2. The entire execution of steps 2 through 7 takes approximately 3 or 4 milliseconds on an IBM S/370 M158, which is less than 1% of the carry pulse period, but it is possible for the current synchronization attempt to be unsuccessful if step 2 started too close to the next common carry pulse from the standard CPU.)

Step 8. The program in the standard CPU executes the following steps (8a through 8e).
 a. Adds a 1 in bit position 31 to the value in location A2 and places the result in location A4. The value in location A4 represents a time of one second beyond the time when all clocks will start. This is the time when the TOD synch check circuits in all CPUs in the system will accurately indicate no synch check.
 b. Store clock in A5;
 c. Compare A5 to A4;
 d. If the value in A5 is less than the value in A4 go to step 8b otherwise continue to step 8e.
 e. Sends a message to every CPU by placing the message "REQUEST NO. 3, ENABLE TOD SYNCH CHECK AND PROCEED" in the common communication area assigned to the standard CPU, and then executes a series of SIGP instructions sending an order code "emergency signal" to each CPU.

Step 9. The program in each slave CPU, and all other CPUs if any, on receiving the emergency signal interruption from the standard CPU, looks in the communication area assigned to the standard CPU. On seeing the message each CPU enables TOD clock synch check interruptions, places the message "REQUEST NO. 3 COMPLETE" in its common communication area, and then goes back to performing useful work.

Step 10. The program in the standard CPU performs a checking procedure waiting for all other CPU communication areas to be flagged with the "REQUEST NO. 3 COMPLETE " message. When all CPUs have responded the program in the standard CPU prints a message to the operator: "Synchronization complete".

The setting of the control register TOD clock control bit trigger 40 in any CPU determines how its TOD clock starts. When trigger 40 is reset to 0, the TOD clock is started by the next oscillator pulse, i.e. at the next microsecond. When trigger 40 is set to 1, the TOD clock is not started until the next common carry pulse, i.e. at the next second.

Thus control register trigger 40 is set to 1 to enable this invention to operate in FIG. 1B, in which case it enables an AND circuit 41 to pass the next common carry pulse from OR circuit 16. During the one second period between carry pulses, the clock synchronization program has executed, taking about 4 milliseconds, and its SET CLOCK instruction in conjunction with the TOD clock switch in the enable set position on any CPU activates AND circuit 33 providing a pulse on line 34. Line 34 has reset the run state trigger 43 that drops the signal on line 52 which deactivates an AND circuit 53 to block any further oscillator pulses from reaching the clock. The clock is then in stopped state. The signal on line 34 also activates gates 55-0 through 55-51 to set the TOD clock 10 to the rounded clock time provided in the memory data register (MDR), as a result of the SET CLOCK instruction. When the next common carry pulse occurs on line 18, it passes a pulse through AND 41, OR 42 to set run trigger 43 which enables AND 53 so that the next oscillator pulse increments the clock.

Figure 4:
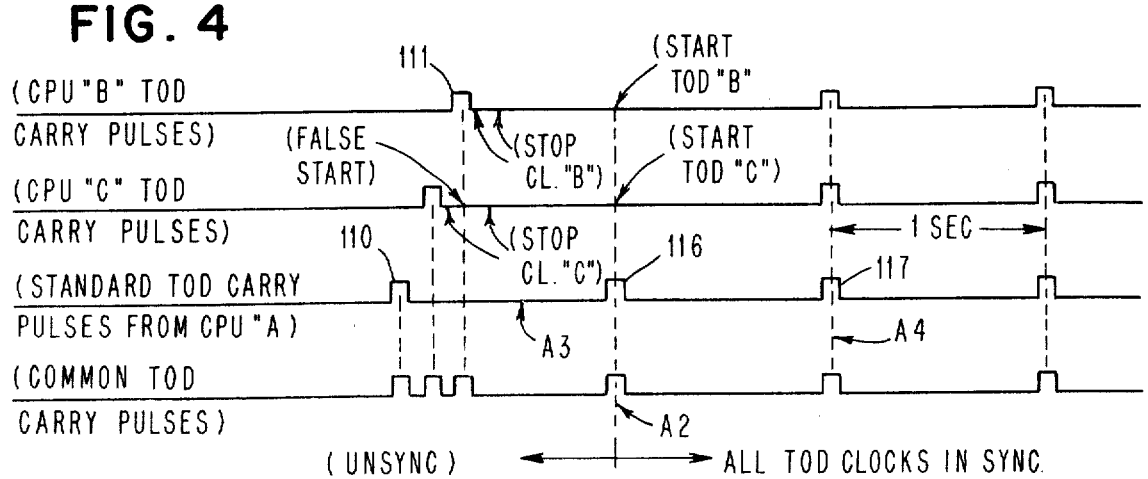
FIG. 4 is a timing diagram illustrating an example of carry pulses from TOD clocks being synchronized in a multiprocessing system.

FIG. 4 illustrates a clock synchronizing operation in a multiprocessing system having CPUs A, B and C. Assume that in the above program, the operator identifies the TOD clock in CPU A as the standard, and the TOD clocks in CPU's B and C to be synchronized.

At the A2 time indicated in FIG. 4, step 2 of the program in CPU A sets into location A2 the "rounded second" time value after which the next carry pulse 116 is expected to occur from the standard clock in CPU A.

In the example in FIG. 4, the clock in CPU C stops before the clock in CPU B due to its earlier execution of step 4. As a result a CPU B carry pulse 111 occurs after CPU C has stopped its clock, but before CPU B has stopped its TOD clock. Consequently, carry pulse 111 is provided as a next common carry pulse on line 18 which falsely starts the TOD clock in CPU C at the time of pulse 111 to incorrectly put it in synch with CPU B but not with the standard CPU A. Therefore, a synch check signal is again provided in all CPU's by the next carry pulse of CPU A to generate synch interrupt signals in all CPUs to begin another synch operation.

Step 4 is repeated by CPU C, (and CPU B) to cure this type of situation, because CPU B has now had time to complete Step 4 and its clock is stopped. (In FIG. 4, the next common pulse will be provided by pulse 116 from the standard clock, at which time the clocks will be stopped in both CPUs B and C.)

After the repetition by step 5 is completed by CPUs B and C, CPU A senses this by scanning for the "REQUEST NO. 2 COMPLETE" message being flagged in the common communication areas for both CPUs B and C. Then CPU A performs step 6 by executing a STORE CLOCK instruction to store the current value of the standard TOD clock into a location A3; this is shown in FIG. 4 at the time in A3 when the TOD clocks in CPUs B and C are stopped.

Clocks B and C are started at time A2 in FIG. 4 in synchronism with the CPU A clock upon the occurrence of standard carry pulse 116 from the TOD clock in CPU A as the next common carry pulse. After pulse 116, all TOD clocks in the system are synchronized.

Thus when step 7 compares the times in locations A3 and A2, the time in location A3 is less than the time in location A2. This is because the time in A3 was recorded while the clocks were stopped and before they were started at the later time A2. If step 7 finds that this comparison is not true (which could occur if the standard clock pulse occurred during the execution of steps 2 through 7) the procedure is repeated from step 2 through step 7.

The time for the execution of steps 2 through 7 takes perhaps 3 or 4 milliseconds on an IBM S/370 Model 158, so that this program ordinarily has time to execute many times, if necessary, in the 1 second period between the carry pulses from the standard TOD clock in CPU A. If the procedure failed the first time through steps 2–7, the circumstances causing the failure will not exist during the second repetition, and it will provide TOD clock synchronism.

Step 8 is necessary to insure that all slave clocks have started and have been in operation for at least one second. This is to prohibit slave CPUs in the multiprocessing system from doing any work until the system is assured that all clocks have been started and are synchronized, since normal programs might use the content of any TOD clock. The one additional second after starting is necessary to ensure that the TOD clock synch check TGR 29 in each CPU has been reset by the concurrent carries from all CPUs enabling AND circuit 17 and AND circuit 27. Thus step 8 provides a program loop to wait until the time of the next following pulse 117 from the standard TOD clock in CPU A. The time for pulse 117 is generated by step 8a.

Then steps 8b through 8d loop until the current time obtained by the last execution of step 8b is equal to or greater than the pulse 117 time in A4. When step 8d finds pulse 117 to have occurred, all CPUs in the system are requested to enable TOD sync check interruptions and step 10 is executed, which prints a message to the operator: "synchronization complete".

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A synchronization system for time-of-day (TOD) clocks in a multiprocessing system, in which all said clocks receive driving pulses from a common oscillator, each TOD clock including a plurality of sequentially arranged bistable circuits, a synchronization circuit associated with each respective TOD clock, each synchronization circuit including carry output means connected to a selected bistable circuit of an associated TOD clock, the selected bistable circuit having a pulse period which is longer than human physical reaction time, the carry output means providing a carry pulse output,
  a synch check circuit including
  phase detector means having inputs connected to carry pulse outputs of all carry output means in the synchronization system to detect when all received carry pulses are in-phase with each other, the phase detector providing an output signal when any received carry pulse is out-of-phase with another received carry pulse to provide a TOD synch check interrupt signal to an associated processor,
  a TOD clock synch switch,
  a first AND circuit having one input conditioned by a setting of the TOD clock synch switch and another input enabled in response to an output of the synch check bistable circuit,
  means for blocking driving pulses to the associated TOD clock in response to an output of the first AND circuit to stop the operation of the associated TOD clock,
  TOD gating means connected to an output of the first AND circuit for transferring into the associated TOD clock a stored predetermined future time setting relating to another TOD clock used as a standard TOD clock, the future time setting indicating the time to occur at a predetermined subsequent carry pulse of the standard TOD clock,
  means for unblocking the driving pulses to the associated TOD clock in response to the predetermined subsequent carry pulse from the output of the OR circuit, in order to start the associated TOD clock at the time occurrence of the future time setting transferred by the TOD gating means,
  whereby the associated TOD clock is started in time synchronization with the standard TOD clock.

2. A synchronization system for TOD clocks in a multiprocessing system, in which the phase detector means further comprises,
  an OR circuit and a second AND circuit each having inputs connected to carry pulse outputs of all carry output means in the synchronization system,
  a third AND circuit having inputs connected to an output of the OR circuit, an inverted output of the second AND circuit, and a gating pulse source,
  a fourth AND circuit having inputs connected to an output of the second AND circuit and a gating pulse source, and
  a synch check bistable circuit having set and reset inputs connected to outputs of the third and fourth AND circuits, an output of the synch check bistable circuit providing a TOD synch check interrupt signal to an associated processor when the synch check bistable circuit is set.

3. A synchronization system for TOD clocks, as defined in claim 1, in which the means for blocking further comprises,
- a run state bistable circuit having a stop input actuated by an output of the fourth AND circuit,
- a fifth AND circuit having one input conditioned by an output of the run state bistable circuit and having another input receiving the driving pulses, the output of the fifth AND circuit being connected to the input of the associated TOD clock,
- whereby disablement of the fifth AND circuit blocks the driving pulses to the associated TOD clock to cause it to have a stopped condition.

4. A synchronization system for TOD clocks, as defined in claim 3, in which the means for unblocking further comprises
- a sixth AND circuit having a synch control input and another input connected to an output of the OR circuit, the synch control input controlling whether TOD synchronization is permitted for the associated TOD clock,
- connecting means between an output of the sixth AND circuit and a start input of the run state bistable circuit,
- whereby enablement of the sixth AND circuit unblocks the passage of driving pulses through the fifth AND circuit to start the associated TOD clock.

5. A synchronization system for TOD clocks, as defined in claim 4, the synchronization circuit further includes
- a synch control bistable device, the bistable device being set and reset under the control of an associated processor, an output of the bistable device being connected to an input of the sixth AND circuit to condition an output of the sixth AND circuit when the associated processor sets the bistable device,
- the connecting means including a second OR circuit having one input connected to the output of the sixth AND circuit and a second input connected to a complementary output of the synch control bistable device,
- an output of the second OR circuit being connected to the start input of the run state bistable circuit, the start input controlling the output state of the run state bistable trigger,
- whereby setting the synch control bistable device enables a synchronization operation to be performed on the associated TOD clock, and resetting the synch control bistable device maintains the associated TOD clock in a continuously running state to disable any synchronization operation on the assoicated TOD clock until the associated processor sets the synch control bistable device.

* * * * *